Nov. 29, 1927.

M. J. SASGEN 1,650,656

SEMIPORTABLE DERRICK

Filed Sept. 26, 1925    5 Sheets-Sheet 1

Witnesses:
William P. Kilroy
Harry C. White

Inventor,
Michael J. Sasgen
Edward Fay Wilson
Atty

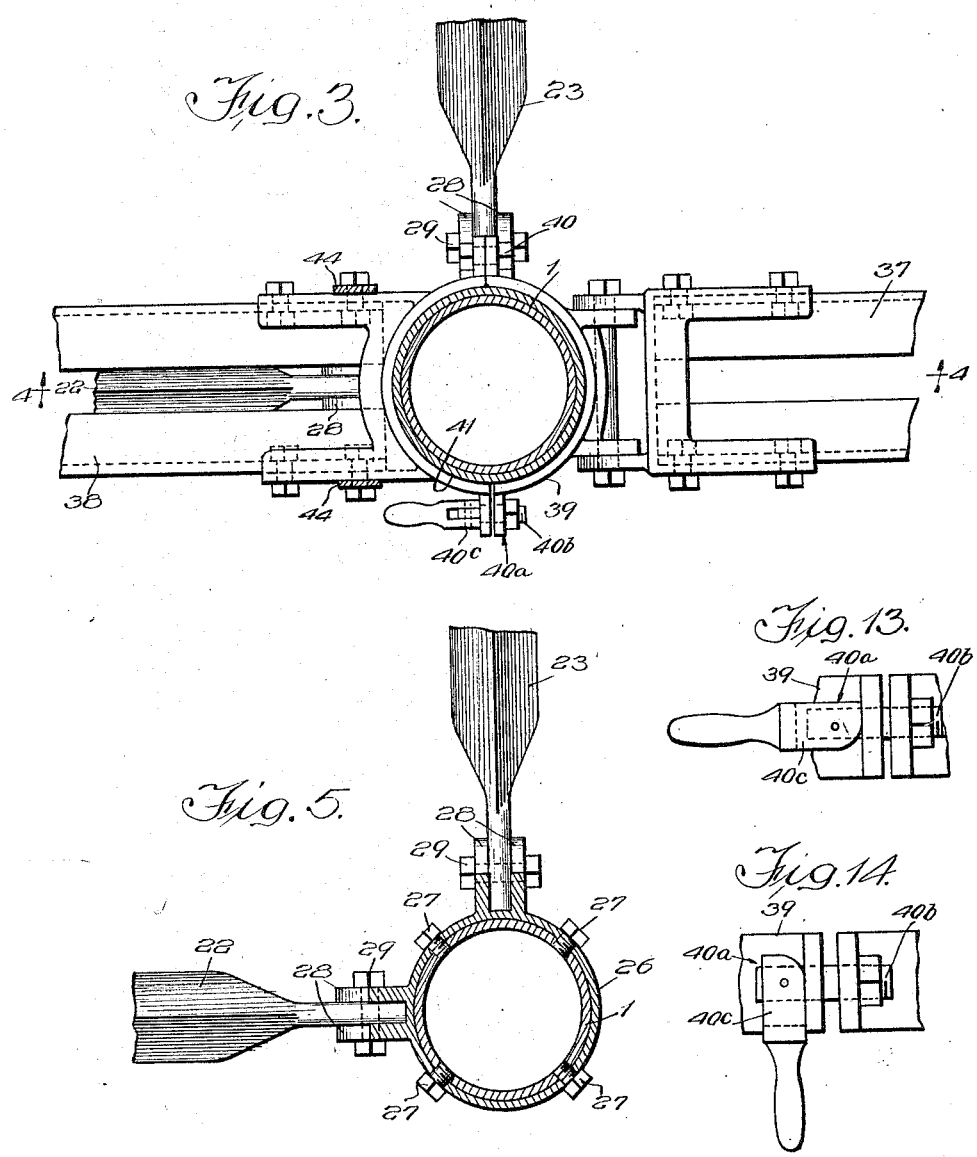

Nov. 29, 1927.
M. J. SASGEN
1,650,656
SEMIPORTABLE DERRICK
Filed Sept. 26, 1925   5 Sheets-Sheet 3
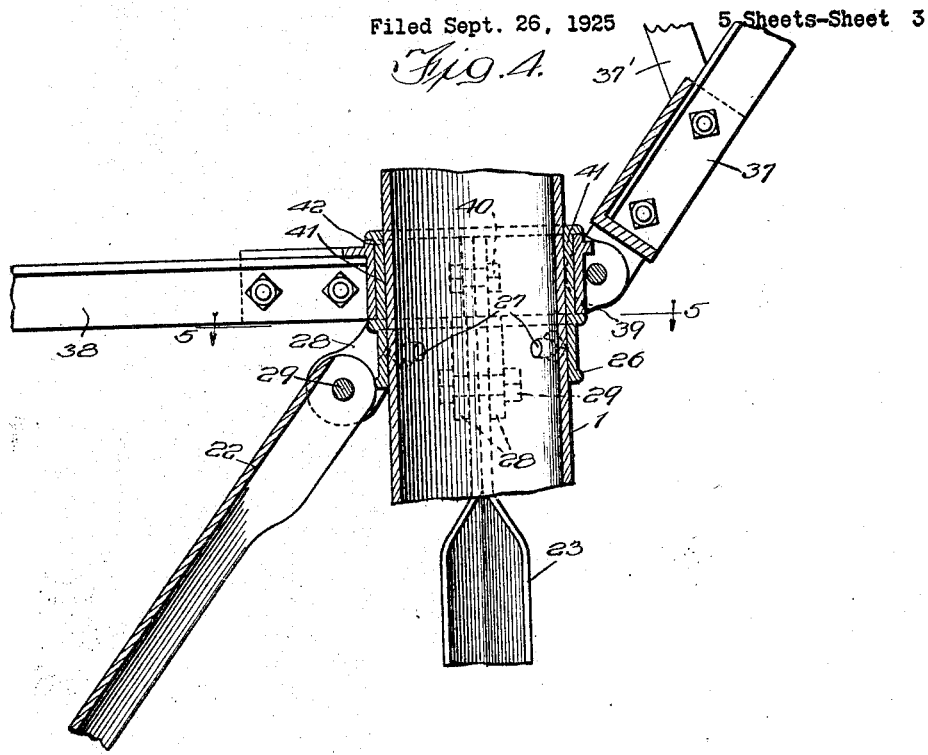
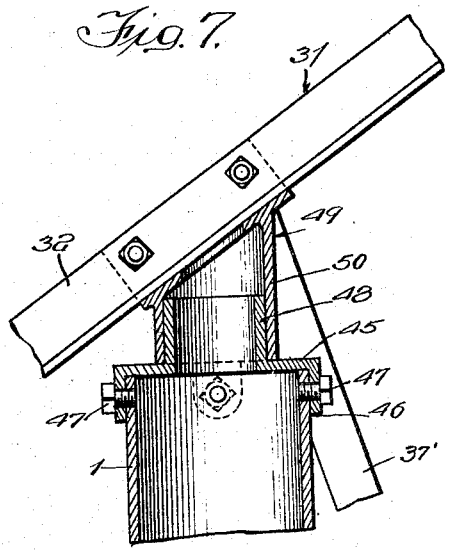
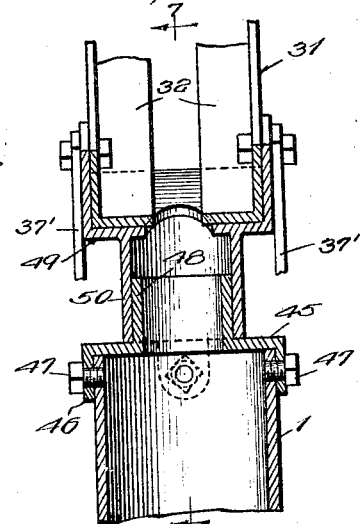
Witnesses:
William P. Kilroy
Harry C. L. White
Inventor:
Michael J. Sasgen
Edward Fay Wilson
By Attys.

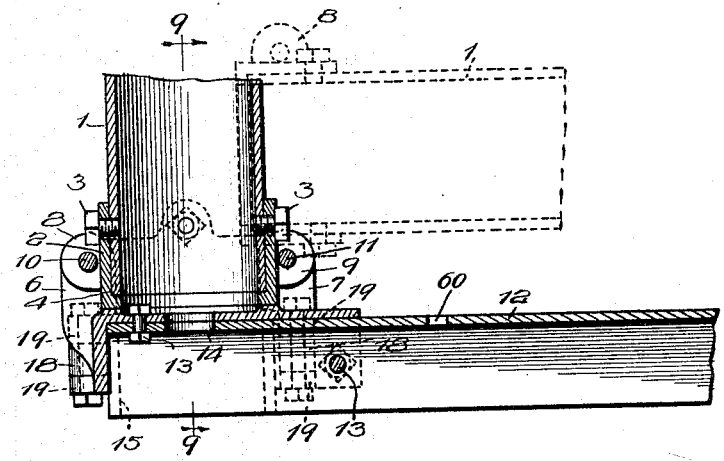
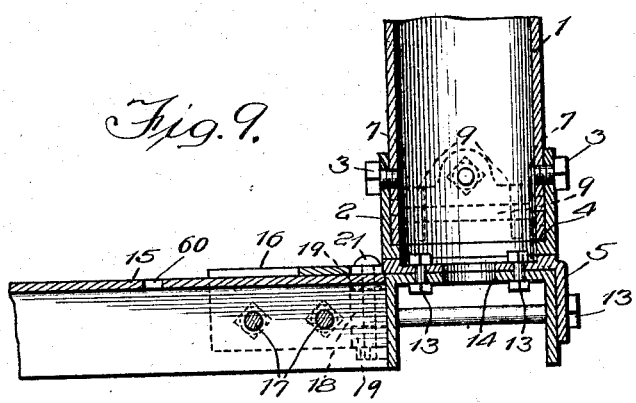
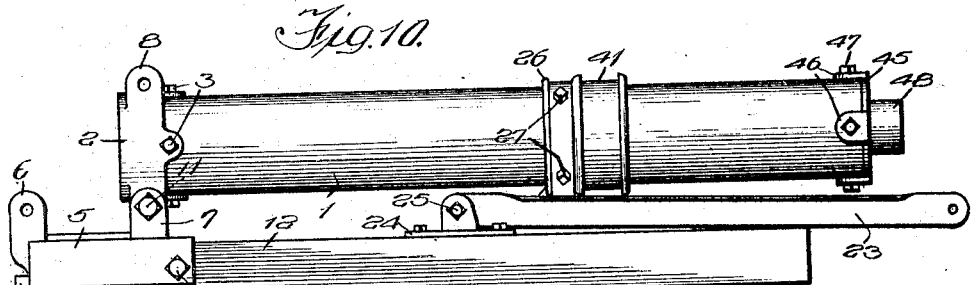

Nov. 29, 1927.　　　　　M. J. SASGEN　　　　　1,650,656
SEMIPORTABLE DERRICK
Filed Sept. 26, 1925　　　5 Sheets-Sheet 5

Witnesses:
William P. Kilroy
Harry C. White

Inventor:
Michael J. Sasgen
Edward Fay Wilson

Patented Nov. 29, 1927.

1,650,656

UNITED STATES PATENT OFFICE.

MICHAEL J. SASGEN, OF CHICAGO, ILLINOIS, ASSIGNOR TO SASGEN DERRICK COMPANY, OF CHICAGO, ILLINOIS, A CORPORATION OF ILLINOIS.

SEMIPORTABLE DERRICK.

Application filed September 26, 1925. Serial No. 58,785.

My invention relates to improvements in derricks and has special reference to derricks which are semi-portable.

The object of this invention is to provide a derrick of the kind mentioned which can readily be taken apart for shipment from place to place and can be readily and easily erected for use.

A further object of the invention is a simple form of semi-portable derrick which is constructed for the ready application of any form of power which it is convenient to make use of.

A further object is to provide means in such a derrick by which the power can be applied, either by means of a power device on the derrick itself or by means of a power device located on a level with the derrick, or located below same, as may be convenient.

A further object is to provide a simple readily collapsible construction whereby a post or pillar can be readily set and held in vertical position, and a boom pivotally mounted on same so as to be swung around horizontally.

Further objects and advantageous features will appear hereinafter.

The invention will be more readily understood from the following description taken in conjunction with the accompanying drawings in which:—

Figure 3, is a fragmentary plan section on the line 3—3 of Figure 1;

Figure 4, is a fragmentary, vertical, sectional view on the line 4—4 of Figure 3;

Figure 5, is a fragmentary, horizontal section on the line 5—5 of Figure 4;

Figure 6, is a fragmentary, vertical, central sectional view on the line 6—6 of Figure 1;

Figure 7, is a fragmentary, vertical, central, sectional view on the line 7—7 of Figure 6;

Figure 8, is a fragmentary, vertical, central, sectional view on the line 8—8 of Figure 1;

Figure 9, is a section similar to Figure 8 but taken at right angles thereto, viz, on the line 9—9 of Figure 8;

Figure 10, is a side elevation showing the base and the post in collapsed or folded condition;

Figure 13, is a fragmentary side elevation of the boom locking ring, showing the cam lever in ring clamping position; and Figure 14, is a view similar to Figure 13, but showing the clamping lever in its non-clamping position.

Figure 1:
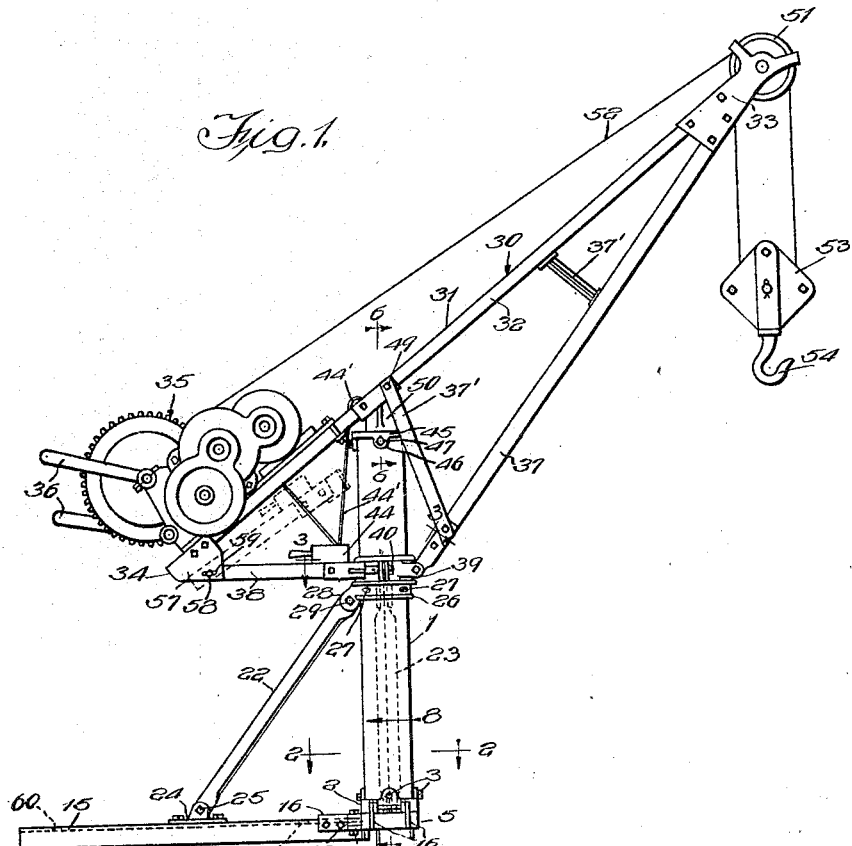
Figure 1, is a side elevation of a semi-portable derrick made in accordance with my invention.

In said drawings 1 represents a post or pillar, preferably made of a piece of metal pipe and which is adapted to be supported in vertical position for use, and is adapted to be arranged in parallel relation to various base or supporting parts when the derrick is arranged in knocked down condition for storage or shipment.

The pillar 1 is mounted at its lower end in base ring casting 2 in which the lower end of the post fits and to which it is rigidly secured by bolts 3.

The ring 2 is formed with an inner annular shoulder 4 upon which the post stands. The ring 2 is secured to a base casting 5 which is provided with two upstanding ears or lugs 6 at one side and with two similar ears 7 at the other side. The base ring 2 is likewise provided with two outstanding lugs 8 at one side, adapted to be received between the lugs 6 and with two similar lugs 9 at the other side, adapted to be received between the two lugs 7. All of these lugs are perforated to receive bolts for securing the post upon the base casting. A bolt 10 secures the lugs 8 between the lugs 6 and a bolt 11 secures the lugs 9 between the lugs 7. The base casting is channel shaped and is adapted to receive the inner end of a base channel member 12, the inner end of the channel member extending beneath the post 1 and the channel member extending out horizontally from the base on a line with lugs 7, and being suitably rigidly secured to the base casting by bolts 13. As best shown in Figure 8, the bottom wall of the base casting 3 and the web of the channel member 12 are provided with an opening 14 centrally located beneath the post 1 for a purpose to be explained. By removing the outer bolt 10 the post 1 can be swung down into parallel relation to the channel member 12, as shown in dotted lines in Figure 10.

Figure 2:
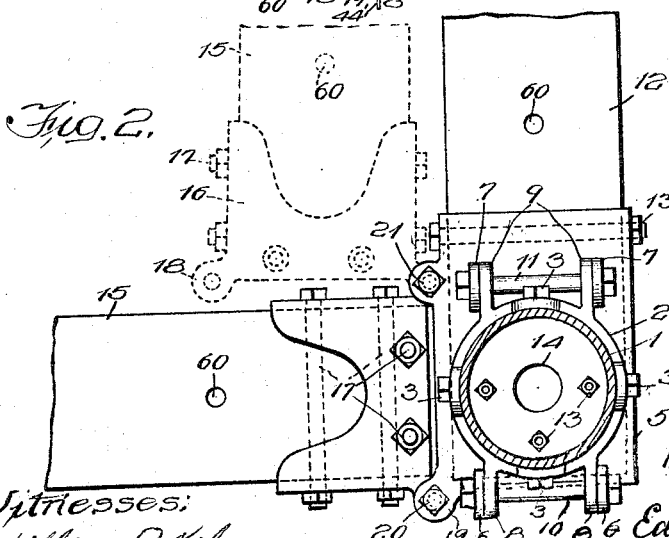
Figure 2, is a fragmentary plan section on the line 2—2 of Figure 1.

Extending out from the base casting 3 at right angles to the channel member 12 is a second channel base member 15. This member is secured at its inner end to the base casting 3 in such a manner that it can be readily swung around in a horizontal plane into parallelism to the member 12 when the derrick is collapsed for shipment. For this purpose there is a connection casting 16 provided secured to the inner end of the channel member 15 by bolts 17 and this casting is provided with perforated lugs 18, one at each side, adapted to be received between a pair of peforated lugs 19 at each side on the base casting 3 and to receive vertical connecting bolts 20 at one side and 21 at the other. By removing the bolt 20, which is at the side farthest from the channel member 12, the channel member 15 can be swung around on the other bolt 21 into parallel relation to the channel member 12, as shown in dotted lines, Figure 2.

For rigidly bracing the post in vertical position upon the base formed of the base casting 3 and the channel members 12 and 15, there is provided diagonal braces 22 and 23, one for each of the channel members, made of a metal angle member and each secured at its lower end to a connection member 24, secured to its channel member by a horizontal bolt 25 upon which the brace can be swung in a vertical plane. The upper ends of the braces are connected to a connecting ring 26, rigidly secured at the proper height to the post 1 by bolts 27. This ring is provided with a pair of outstanding lugs 28 for each of the braces 22 and 23, adapted to receive the upper ends of the braces between them and to be separably connected to same by horizontal bolts 29. By removing the bolts 29 the braces can each be swung down on the lower end bolts 25 into parallel relation with its base channel member when the derrick is collapsed, as best shown in Figure 10.

The post 1 serves as a support for a boom 30 and the boom is adapted to swing around horizontally on the post through a complete circle. The boom 30 comprises a top member 31 made up of two metal angle members 32, parallel with each other and extending from end to end of the boom and connected rigidly together by suitable connector and spacer plates. The boom is preferably arranged in inclined position with its outer end 33 raised considerably above the top of the post 1. This gives an added capacity to the lift of the derrick. The rear or inner end 34 of the boom is shorter than the outer end and is brought down low enough so that when a power device, such as an electric hoist 35, is secured upon the rear end the control levers 36 are at a suitable height to be manually operated. The boom 30 also includes brace members 37 and 38. The brace member 37 is secured rigidly to the outer end 33 of the boom 30 and extends downwardly and inwardly toward the post 1, its lower end being connected to a support ring 39. The ring 39 is made of two parts secured together by a bolt 40 at one side and a clamping device 40$^a$ at the other side, and is mounted in a circumferential channel 41 provided in an upper extension 42 of the fixed ring 26. The brace 37 is rigidly connected to the upper member 31 by a number of braces 42. The rear end 34 of the upper member is also braced by the brace member 38 which is connected at one end to the rear end of the member 31 and at its inner end to one of the parts of the split ring 39.

The boom is pivoted upon the top of the post by means of a support casting 45, having a circumferential flange 46 on its lower side within which the upper end of the post 1 is received and to which it is fastened by bolts 47 and an upwardly extending central nozzle 48 on its upper side. The boom is mounted on this support by means of a casting 49 rigidly secured to the boom and having a central depending nozzle 50 which receives the nozzle 48 and rests at its lower end upon the support 45. The several castings and nozzles are provided wtih openings in axial alignment with the post 1 for a purpose to be explained. By this means of mounting the boom it can swing around horizontally on the pivot at the top, formed by the two nozzles and upon the ring 39 at the bottom of the boom. The boom, as described, is exceedingly stiff, strong and rigid, and relatively light in weight.

There is a sheave 51 suitably mounted at the outer end of the boom over which a hoist cable 52 can be trained and usually a hoist block 53, having a hook 54, is hung in a bight of the cable. The fall end of the cable, as illustrated in Figure 1, is carried to a suitable winding drum forming part of the power device 35.

Figure 11:
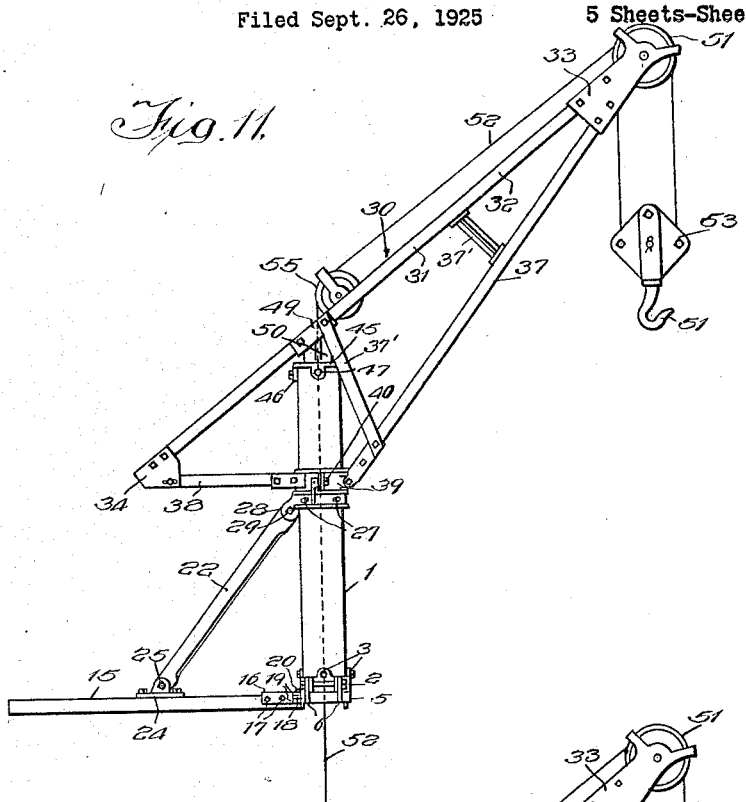
Figure 11, is a view similar to Figure 1, showing the derrick arranged for the application of power from a source below the derrick.

In the form illustrated in Figure 11, a guide sheave 55 is provided on the beam 30 by which the cable is guided down through the post 1 and is indicated as being directed to a hoist device located on a level below that of the derrick.

Figure 12:
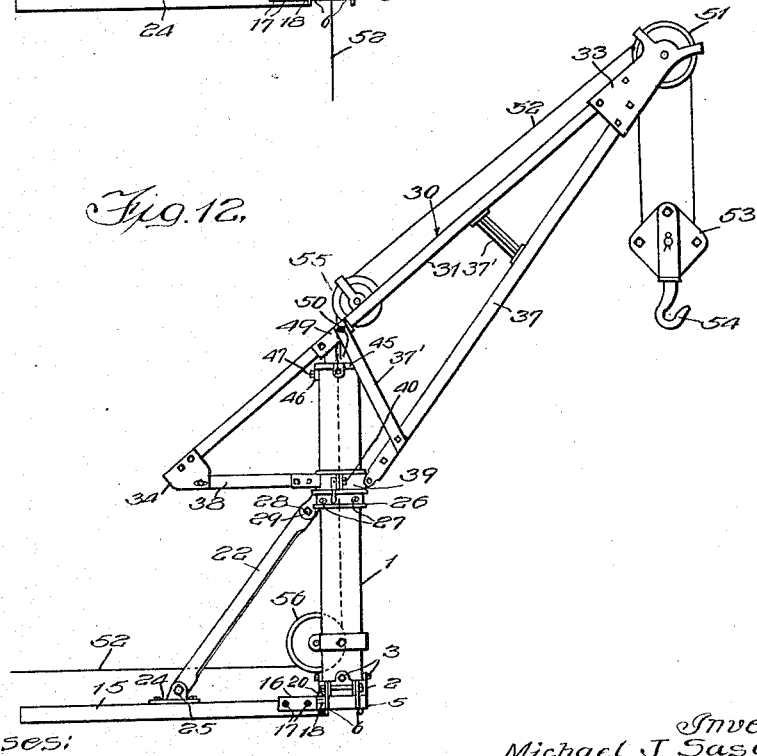
Figure 12, is a view similar to Figure 11 but showing the derrick arranged for the application of power from a source located on the level of the derrick.

In Figure 12 I have shown the post as being provided with a second cable guide sheave 56 near its lower end and by means of which the cable 52 can be directed out of the post 1 near its lower end to a hoist device located on the level of the derrick. While I have only illustrated at 35 an electric hoist, it will be understood that power can be applied to the hoist cable 52 from any suitable cable winding mechanism.

When it is desired to dismount the beam 30 and collapse the derrick for storage or shipping the split ring 39 is loosened so that it can be freed from the flanges bordering the channel 41 in the upper extension of the fixed ring 26. Then the rear half of the split ring which is secured to the forward end of the horizontal brace 38 can be pulled out of the channel 41. To permit this action the plates 57 to which the rear end of the brace 38 is connected by a bolt 58 are slotted for receiving the bolt, as shown at 59. After the rear part of the ring 39 has been pulled out of the channel 41 the forward half of the ring can be pulled out by depressing the rear end 34 of the boom 30, thus lifting the forward end 32, the top pivot being loose enough to permit this action. Thereafter the boom is lifted up off of the post. Then the braces 22 and 23 are loosened at their upper ends and swung out and down, then the base channel 15 is loosened and swung around parallel with the base channel 12. Then the post 1 is loosened and swung down into horizontal position parallel with the base channels.

When an electric hoist 35 is used, mounted on the rear end of the boom, a switch box 44 is secured upon the forward end of the horizontal brace 38. For connecting the electric hoist with a source of supply of electricity a suitable cable 44' leads from the switch box up to the top of the hollow post 1 and down through same. This method of connection protects the cable and permits the boom to be swung around without hindrance.

As best shown in Figures 3, 13 and 14, the clamping device 40ª of the split ring 39 comprises a bolt member 40ᵇ provided at one end with a nut and in place of a head at the other end, with a cam lever 40ᶜ pivotally mounted on the bolt. The two parts of the ring 39 which are connected by the bolt clamping device are purposely made spread apart and the ring 39 is adapted to be clamped tightly upon the post, that is, within the channel 41, to prevent the boom swinging around, by forcing said parts together by means of the cam lever 40ᶜ. When the lever hangs down the boom can be swung around on the post 1, and when the lever 40ᶜ is swung up to horizontal position the ring 39 is tightly clamped upon the post and the boom is held against swinging around.

The channel base members 12 and 15 are provided with holes 60 in the webs of the channels for receiving fastening bolts for preventing the derrick tipping over in use.

It should be noted that the brace 38 with the switch box thereon can be swung up against the rear part of the boom, as shown in dotted lines in Figure 1, when the forward end of the brace has been freed from the channel 41.

It is to be noted that the electric or other hoist device secured on the shorter rear end of the boom 30 tends to counterbalance the longer forward end and causes the boom to swing easily around on the post.

As many modifications of my invention will readily suggest themselves to one skilled in the art, I do not limit or confine my invention to the specific construction herein shown and described.

I claim:

1. In a derrick of the kind described, a post, means for retaining the post upright, a boom pivotally mounted on the top of the post at a point nearer one end than the other of the boom, the boom inclined upwardly toward its longer end, an inclined rigid brace extending down from the long end of the boom to the post, the lower end of the brace secured to a bearing ring mounted in a circumferential channel on the post, a second brace extending from said ring to the rear end of the boom, said ring being split and adapted to be separated for dismounting the boom from the post, and said second brace arranged to be moved longitudinally in relation to the boom to separate the parts of the ring.

2. In a derrick of the kind described, a post, means for retaining the post upright, a boom pivotally mounted on the top of the post at a point nearer one end than the other of the boom, the boom inclined upwardly toward its longer end, an inclined rigid brace extending down from the long end of the boom to the post, the lower end of the brace secured to a bearing ring mounted in a circumferential channel on the post, a second brace extending from said ring to the rear end of the boom, said ring being split and adapted to be separated for dismounting the boom from the post, said second brace arranged to be moved longitudinally in relation to the boom to separate the parts of the ring, and a hoist device having a cable drum mounted on the rear shorter end of the boom.

3. In a derrick of the kind described, a post, means for retaining the post upright, a boom pivotally mounted on the top of the post at a point nearer one end than the other of the boom, the boom inclined upwardly toward its longer end, an inclined rigid brace extending down from the long end of the boom to the post, a bearing ring mounted in a groove on the post below its top, the bearing ring split transversely and the lower end of said brace secured to the forward half of the ring, a second brace extending from the rear half of the ring to the rear end of the boom, the connection between said brace and the boom being slotted to permit longitudinal movement of said second brace for separating the two parts of the ring to permit the removal of the boom from the post.

In testimony whereof, I have hereunto set my hand, this 28th day of August, 1925.

MICHAEL J. SASGEN.